J. W. LOW.
BUTTER WRAPPER.
APPLICATION FILED APR. 19, 1918.
1,391,551.
Patented Sept. 20, 1921.
2 SHEETS—SHEET 1.
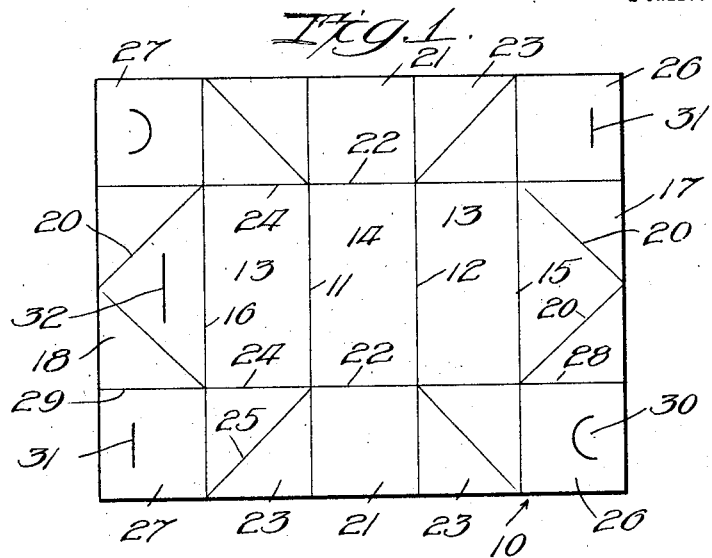
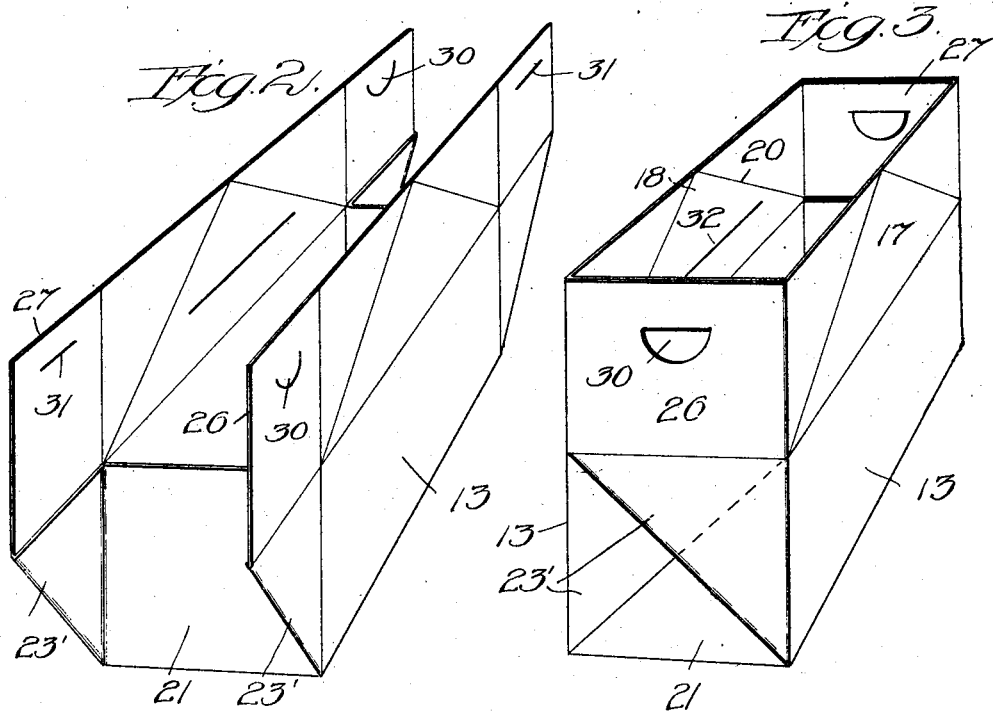
Witness:
Harry S. Gaither
Inventor:
John W. Low
by William L. Hale
Atty J. W. LOW.
BUTTER WRAPPER.
APPLICATION FILED APR. 19, 1918.
1,391,551.
Patented Sept. 20, 1921.
2 SHEETS—SHEET 2.
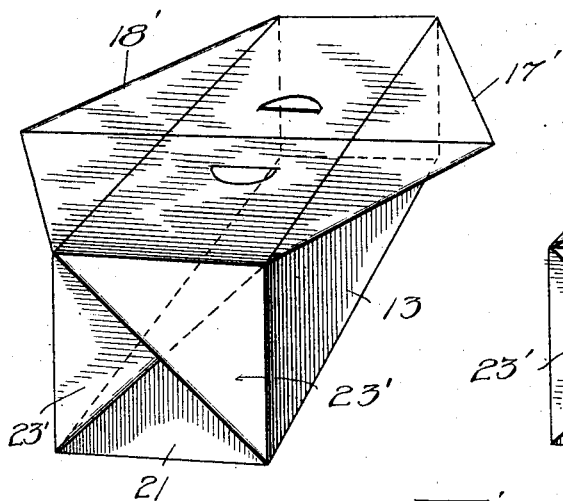
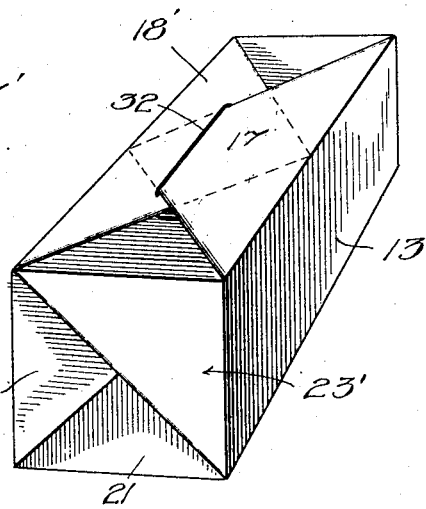
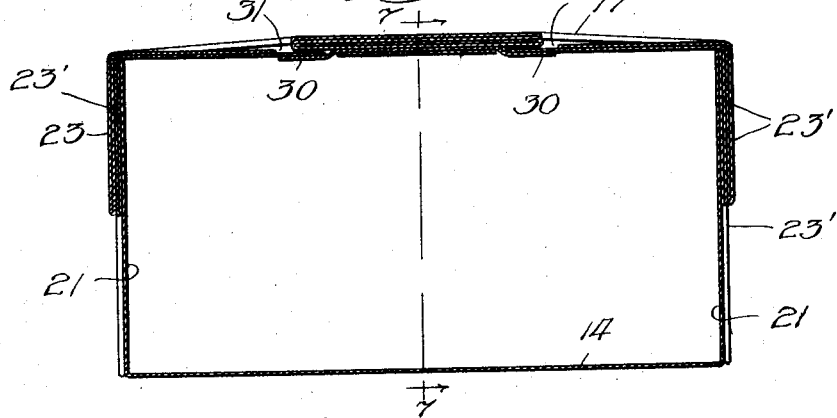
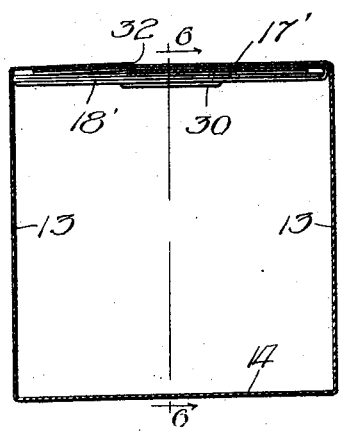
Inventor:
John W. Low

UNITED STATES PATENT OFFICE.

JOHN W. LOW, OF JOLIET, ILLINOIS, ASSIGNOR TO NATIONAL CARTON COMPANY, OF JOLIET, ILLINOIS, A CORPORATION OF ILLINOIS.

BUTTER-WRAPPER.

1,391,551.     Specification of Letters Patent.     Patented Sept. 20, 1921.

Application filed April 19, 1918. Serial No. 229,504.

*To all whom it may concern:*

Be it known that I, JOHN W. LOW, a citizen of the United States, and a resident of Joliet, in the county of Will and State of Illinois, have invented certain new and useful Improvements in Butter-Wrappers; and I do hereby declare that the following is a full, clear, and exact description thereof, reference being had to the accompanying drawings, and to the characters of reference marked thereon, which form a part of this specification.

This invention relates to a novel wrapper for butter and like products of a nature to be readily folded so as to be wrapped about a quantity of butter of predetermined weight, and of such weight and texture as to constitute a carton for the butter when wrapped therearound.

The object of the invention is to produce an exceedingly simple and economical wrapper for the purpose set forth, and also to produce a wrapper which may be cut from paperboard or the like without waste.

The invention consists in the combination and arrangement of the parts as shown in the drawings and described in the specification, and is pointed out in the appended claims.

In the drawings, Figure 1 is a plan view of the wrapper blank scored and cut ready for folding.

Figs. 2, 3, and 4 are perspective views illustrating the manner of folding the wrapper about the butter or other commodity.

Fig. 5 is a perspective view of the wrapper completely closed.

Fig. 6 is a longitudinal section on line 6—6 of Fig. 7.

Fig. 7 is a transverse section on the line 7—7 of Fig. 6.

The blank 10 shown in Fig. 1 is made of a single sheet of material, such as paperboard, and is rectangular. It is divided by score lines 11, 12 to produce wall sections 13, 13, and 14, the wall sections 13 constituting in the set-up wrapper the side walls thereof, and the section 14 constituting the bottom wall of the wrapper. Other score lines 15, 16 divide the wall sections 13 from two marginal sections 17, 18 which said sections 17, 18 are provided with oblique score lines 20 that extend from the ends of the score lines 15 and 16 to the edges of the sections 17, 18 at the middle points of said edges, giving to the area bound by said score lines 20 and the lines 15 and 16 a triangular shape.

The central or bottom wall section 14 is provided with terminal flaps 21, 21 divided from said section 14 by score lines 22. Said flaps 21 are folded at right angles to said bottom section to constitute part of the end walls of the folded wrapper. The side wall sections 13, 13 are provided with like terminal flaps 23, 23, which are divided from the sections 13 by score lines 24, 24. Said terminal flaps 23 are bi-sected by oblique score lines 25. The sections 17, 18 are likewise provided with terminal flaps 26, 27, respectively, that are divided from the sections 17, 18 by score lines 28, 29, respectively. The terminal flaps 26, 27, at diagonally opposite corners of the blank, are provided with locking tongues 30, which, when the wrapper is folded, enter slits 31 formed in other diagonally opposite flaps 26, 27. The marginal section 18 is provided with a locking slit 32.

The manner of folding the blank thus cut and scored is illustrated in Figs. 2, 3, and 4, inclusive. Beginning with the illustration of the folding operation shown in Fig. 2, it will be seen that the side wall sections 13 are first folded upwardly at right angles to the bottom wall section, and thereafter the terminal flaps 21 are folded upwardly at right angles to the bottom wall section to constitute portions of the end walls of the set-up wrapper. In so folding the terminal flaps 21, the adjacent flaps 23 are caused to be folded along their oblique score lines 25 to produce triangularly folded flaps 23'. These flaps are folded inwardly toward each other against the terminal flaps 21; the overlapping flaps constituting the complete end wall of the wrapper.

When turning the triangular flaps 23' inwardly, the terminal flaps 26, 27 are caused to move inwardly in a horizontal position, one over the other at each end of the wrapper, so that the two flaps 26, 27 at each end of the wrapper constitute, when thus folded into horizontal position, as shown in Figs. 4 and 5, a portion of the top wall of the wrapper; the flaps 26, 27 at the opposite ends of the wrapper meeting midway the ends of the wrapper. In assembling the flaps 26, 27 the flap 26 is first folded inwardly, so that its locking slit 31 may be engaged by the locking tongue 30 on the other subsequently folded flap 26, thereby locking the overlying flaps 26 and 27 together.

When turning the flaps 26, 27 inwardly, the sections 17 and 18 are caused to fold along their oblique score lines 20, 20 to produce triangular locking flaps 17' and 18', and the point of one of said flaps 17' is inserted in the locking slit 32 of the triangular flap 18'. Said triangular flaps produced by folding the scored section 17, 18, not only lock the sections of the wrapper together, but serve also to overlie the meeting ends of the flaps 26, 27 and constitute part of the top wall of the wrapper.

The wrapper may be made of comparatively light weight paperboard, and when used for butter and like products is impregnated with paraffin or other oil-proof medium. The weight of the material is such that, with the locking means described, the wrapper will retain its form on the commodity without the necessity of applying any further fastening means.

I claim as my invention,—

1. A wrapper for the purpose set forth comprising a sheet of scored material, including bottom and side walls and end walls of multi-thickness formed in part of terminal flaps of the bottom wall of a depth equal to the depth of the side walls and in part of triangular sections formed by diagonally folding adjacent side wall terminal flaps, and a top wall comprising members including inwardly turned terminal flaps of said side walls and inwardly turned underlying end extensions of the latter flaps, said end extensions at each end of the wrapper lying one over the other and one provided with a locking tongue to enter a locking slit of the other.

2. A wrapper for the purpose set forth comprising a sheet of scored material, including bottom and side walls and end walls of multi-thickness formed in part of terminal flaps of the bottom wall of a depth equal to the depth of the side walls and in part of triangular sections formed by diagonally folding adjacent side wall terminal flaps, and a top wall comprising members including inwardly turned terminal flaps of said side walls and inwardly turned underlying end extensions of the latter flaps, said side wall terminal flaps being diagonally folded to form double wall triangular locking tongues, the points of which lie one over the other, the outer wall of one of said tongues being slitted to receive the point of the other or overlying tongue.

3. A wrapper for the purpose set forth comprising a sheet of scored material, including bottom and side walls and end walls of multi-thickness formed in part of terminal flaps of the bottom wall of a depth equal to the depth of the side walls and in part of triangular sections formed by diagonally folding adjacent side wall terminal flaps, and a top wall comprising members including inwardly turned terminal flaps of said side walls and inwardly turned underlying end extensions of the latter flaps, said end extensions at each end of the wrapper lying one over the other and one provided with a locking tongue to enter a locking slit of the other, said side wall terminal flaps between said extensions being diagonally folded from the outer ends of the side walls inwardly to form pointed locking tongues.

4. A wrapper blank comprising bottom and side wall sections divided by score lines, provided with equal dimensioned rectangular terminal flaps divided by score lines, the flaps of the side wall sections being diagonally scored, and marginal sections divided from the side wall sections by score lines and themselves provided with rectangular terminal flaps, the terminal flaps of the marginal sections being provided with locking tongues and slits, and the marginal sections being diagonally scored from the intersections of the score lines which divide said marginal sections from the side wall sections and their extension flaps to the free edge of said marginal sections, intermediate of the ends thereof.

In testimony whereof I claim the foregoing as my invention, I hereunto append my signature at Joliet, Illinois, this 16th day of April, 1918.

JOHN W. LOW.